United States Patent [19]

Anderson et al.

[11] 4,281,106

[45] Jul. 28, 1981

[54] HEAT-RESISTANT, RIGID POLYMERS FROM DIFUNCTIONAL 9,10-DIHYDRO-9,10-ETHANOANTHRACENES

[75] Inventors: Burton C. Anderson; August H. Frazer, both of Wilmington, Del.

[73] Assignee: E. I. Du Pont de Nemours and Company, Wilmington, Del.

[21] Appl. No.: 57,113

[22] Filed: Jul. 12, 1979

[51] Int. Cl.$^3$ .............................................. C08G 69/26
[52] U.S. Cl. .................................... 528/344; 525/420;
528/74; 528/183; 528/201; 528/211; 528/229;
528/298; 528/336; 528/338; 528/340; 528/347;
528/348
[58] Field of Search ............... 528/344, 183, 211, 229,
528/298, 74, 367, 201, 480, 481; 525/420

[56] References Cited

U.S. PATENT DOCUMENTS

| | | | |
|---|---|---|---|
| 3,301,827 | 1/1967 | Martin | 528/344 |
| 3,642,709 | 2/1972 | Agolini | 528/344 |
| 3,668,189 | 6/1972 | Goetz | 528/344 |

*Primary Examiner*—Harold D. Anderson

[57] ABSTRACT

High molecular weight processible polymers derived from 2,6- and 2,7-diacids, diols and diamines of 9,10-dihydro-9,10-ethanoanthracenes and various complementary comonomers are prepared. These are converted into rigid, thermally-stable anthraceno polyesters and polyamides by thermal removal of the 9,10-ethano bridge.

10 Claims, No Drawings

HEAT-RESISTANT, RIGID POLYMERS FROM DIFUNCTIONAL 9,10-DIHYDRO-9,10-ETHANOANTHRACENES

BACKGROUND OF THE INVENTION

1. Field of the Invention

This invention relates to high molecular weight processible polymers derived from 2,6- and 2,7-diacids, diols and diamines of 9,10-dihydro-9,10-ethanoanthracenes, and their conversion into rigid, thermally-stable anthraceno polymers.

2. Description of the Prior Art

The prior art discloses 9,10-difunctional 9,10-ethanoanthraceno compounds of the type

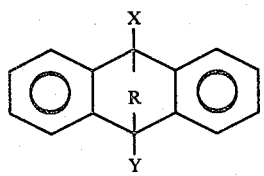

where X and Y may be —COOR$^1$ (R$^1$=alkyl of 1–4 carbons or H), —R"OH (R"=alkylene of 1–4 carbons), —NH$_2$; R may be CHZ-CHZ (Z=H, halogen or alkyl). Polyesters and polyamides are prepared from the above.

Also disclosed are (non-polymeric) substituted 9,10-dihydro-9,10-ethanoanthracenes of the type

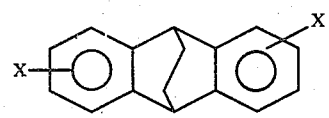

| X | Substituent Positions |
|---|---|
| —NO$_2$ | 2,7 and 2,8 |
| —NH$_2$ | 2,6, 1,5 |
| —COOCH$_3$ | 1,5 |
| —OH | 1,5 |
| —H | — |

Compounds of the type

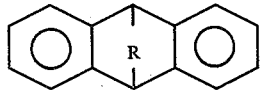

where R is —CH$_2$CH$_2$—,

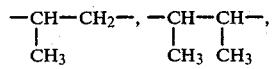

—C(CH$_3$)$_2$CH$_2$— and —C(CH$_3$)$_2$CH(CH$_3$)— are known.

The reaction

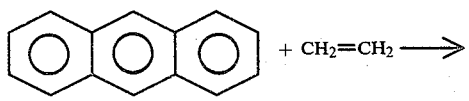

is known. Also known is the reverse reaction of eliminating the ethano bridge.

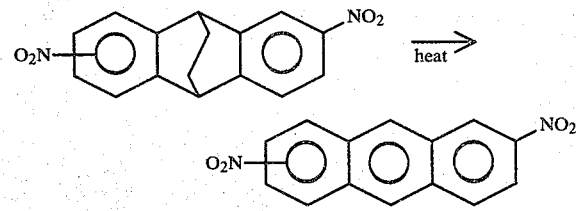

The concept of converting tractable, frabricable polymers to intractable polymers by thermal elimination of small molecules is known; e.g. conversion of polyamic-acids to polyimides, and poly-O-acyl amideoximes and polyhydrazides to poly oxadiazoles by thermal elimination of H$_2$O.

Polyesters, polyamides, polyurethanes and polycarbonates prepared from unbridged, difunctional anthracene derivatives of the type

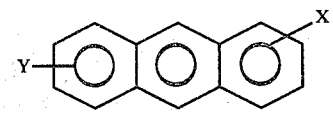

where X and Y may be —COOR$^1$, —COCl, —NH$_2$, —OH, and —NCO are known. Specifically disclosed are polyamides, polyesters and polycarbonates from 1,5-, 1,8- and 2,6- anthracene dicarboxylic acid; polycarbonates from 1,5-dihydroxyanthracene; copolyamide-urea polymers from 1,4-, 1,5- and 2,6-anthracene dicarboxylic acid; polycarbonates from 1,5-dihydroxyanthracene; copolyamideurea polymers from 1,4-, 1,5- and 2,6-anthracene dicarbonylchloride.

Shaped articles including fibers and films, prepared directly by melt and/or solution methods from polymers containing anthracenic segments are broadly disclosed in the art.

SUMMARY OF THE INVENTION

Condensation polymers containing the anthracene moiety

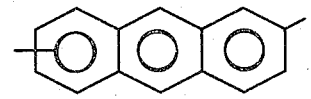

tend to be crystalline, rigid and heat resistant, but high-melting and of low solubility and therefore difficult, if not impossible, to fuse and melt-process or solution-cast into shaped articles. The present invention provides novel, melt and/or solution-processible polymers containing the ethanoanthraceno moiety

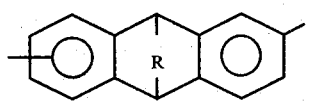

wherein R is —CR'$_2$CHR'—, and R' is H or CH$_3$, which are amorphous, comparatively low-melting, soluble and tractable.

The 9,10-dihydro-9,10-ethanoanthracene (or 9,10-dihydro-9,10-methyl substituted ethanoanthracene) polymers of this invention are of the formula

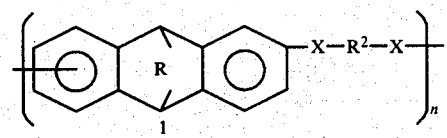

wherein R$^2$ is, independently, an alkylene group containing 2–14 carbon atoms, an arylene containing 6 to 14 carbon atoms, an alkyl-substituted or chloro-substituted arylene containing 6 to 14 carbon atoms, or a cycloalkylene containing from 2 to 14 carbon atoms, or

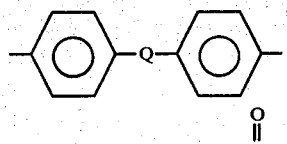

where Q is —O—, —OCH$_2$OCH$_2$O—, —C(=O)—, —(CH$_2$)$_m$— where m is 1 to 10,

—C(CH$_3$)$_2$—, —(CF$_2$)$_o$— where o is 1 to 18, —C(CF$_3$)$_2$—, —NR$^3$— where R$^3$ is an alkyl group containing 1 to 6 carbon atoms,

—S—, —S(=O)$_2$—, —C(=O)—R$^2$—C(=O)— where —R$^2$— is as defined above;

X is selected from the group consisting of

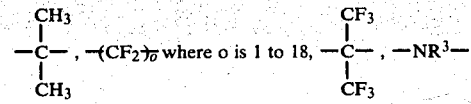

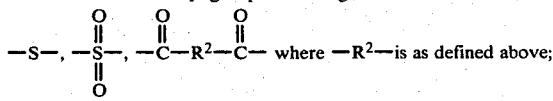

R is as defined above, and n is at least 10.

The amorphous ethanoanthraceno polymers of this invention can be processed from their melts or solutions or by other known polymer processing methods into shaped articles such as films, fibers, molded objects and the like. The shaped articles formed therefrom serve as intermediates to relatively crystalline, high-melting, rigid, heat-resistant anthraceno polymers and shaped articles thereof, said products being prepared by thermal elimination of an olefin from the ethanoanthraceno polymers, preferably in the form of shaped articles

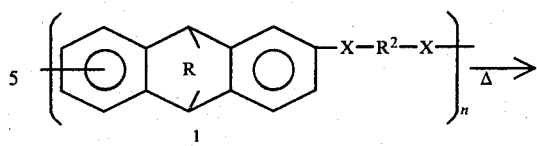

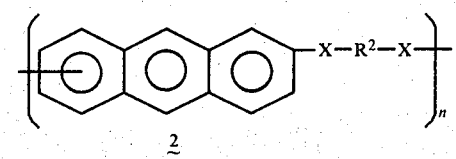

+ CR$_2$'=CHR'

Preferred ethanoanthraceno polymers for the purpose of shaping and converting to anthraceno polymers are polyesters and polyamides of formula 1 wherein X is

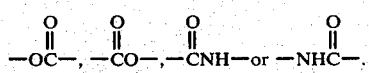

This invention provides, we believe for the first time, a practical means of obtaining useful shaped articles from high molecular weight, relatively intractable anthraceno polymers of formula 2. Said articles have high moduli and good retention of properties at elevated temperatures.

DETAILED DESCRIPTION

The discovery of amorphous condensation polymers of formula 1, containing the ethanoanthraceno moiety, permits, for the first time, a practical preparation of shaped articles of normally intractable, relatively crystalline anthraceno polymers of formula 2 by the process of (1) preparing the 9,10-dihydro-9,10-ethanoanthraceno polymers;
(2) forming said polymers into shaped articles, and
(3) thermally converting said polymers, in the form of shaped articles, into the corresponding anthraceno polymers.

The polymers of formula 1 are prepared by condensing together two or more monomers, at least one of which is drawn from each of two groups of difunctional compounds. The first of these groups comprises monomers of the formula

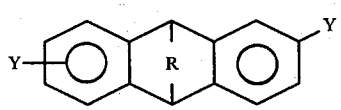

wherein Y is selected from the group consisting of —NH$_2$,

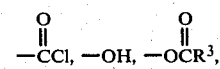

or —CO$_2$R$^3$, where R$^3$ is H or alkyl of 1 to 4 carbon atoms. The substituents Y may occupy the 2- and 6-positions or the 2- and 7-positions; useful monomers may therefore comprise either the 2,6- or 2,7-isomers, or mixtures thereof.

The second group of monomers comprises difunctional compounds of the formula $$Z-R^2-Z$$
<span style="margin-left:2em">4</span> wherein Z may be —OH, —OCR³ (with =O), —CO₂R⁴, —COCl,

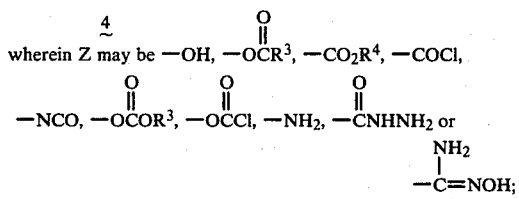

—NCO, —OCOR³, —OCCl, —NH₂, —CNHNH₂ or
—C(NH₂)=NOH;

R² and R³ are as defined above, R⁴ may be H, alkyl of 1 to 8 carbon atoms or aryl of 6 to 8 carbon atoms.

The formula 3 compound and the formula 4 compound are selected so that the polycondensation thereof will generate either a polyester, polyhydrazide, polycarbonate, polyamide, polyurethane, polyurea, or polyoxadiazole. Moreover, a wide variety of copolymers may be produced by combining more than two monomers, at least one of which is drawn from each of the two groups. Copolymers, e.g. copolyesters, copolyamides, etc., may result from combining isomers of one formula 3 compound with one or more isomers of a formula 4 compound. Alternatively, "crossed" copolymers such as polyester-amides, polyestercarbonates, polyurethane-ureas may be produced by combining one or more different formula 3 compounds with one or more different formula 4 compounds.

9,10-Dihydro-9,10-ethanoanthracenes

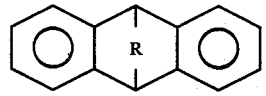

can be prepared from anthracene and an olefin such as ethylene, propylene, butene-1, butene-2, isobutene or 2-methyl-2-butene; for example:

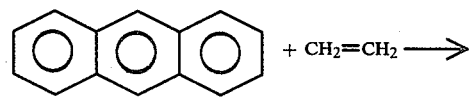 + CH₂=CH₂ ⟶

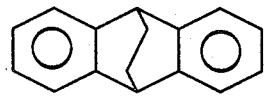

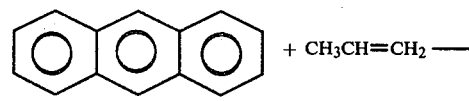 + CH₃CH=CH₂ ⟶

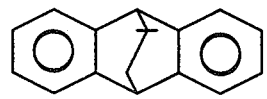

2,6- and 2,7-dicarboxylic acids can be prepared from the 9,10-dihydro-9,10-ethanoanthracenes by Friedel-Crafts acylation with oxalyl chloride in the presence of aluminum trichloride; reaction of the dicarboxylic acids with an alcohol provides the corresponding esters.

2,6-Diacylates

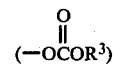
(—OCOR³)

of 9,10-dihydro-9,10-ethanoanthracenes are prepared by reacting the corresponding anthracene 2,6-diacylate with an olefin. The 2,6-diols of 9,10-ethanoanthracenes are similarly prepared from the corresponding anthracene diols.

2,6- And 2,7-diamino-9,10-dihydro-9,10-ethanoanthracenes are prepared by reduction with hydrogen from the known compounds

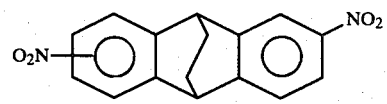

Formula 4 monomers are known compounds and include the following:

Dicarboxylates (acids and esters) (Z=—CO₂R⁴)
Terephthalic acid; dimethyl, diethyl and diphenyl esters
Methyl terephthalic acid; dimethyl and diphenyl esters
Chloro terephthalic acid; dimethyl, diphenyl esters
Phenyl terephthalic acid; dimethyl and diphenyl esters
4,4'-dicarboxybiphenyl; dimethyl and diphenyl esters
4,4'-oxybibenzoic acid; dimethyl, diphenyl esters
2,6-naphthalene dicarboxylic acid; dimethyl, diphenyl esters
1,2-bis(4-carboxyphenoxy)ethane; dimethyl, diphenyl esters
Isophthalic acid; dimethyl, diethyl, diphenyl esters
Adipic acid; dimethyl, diphenyl esters
Succinic acid; dimethyl, diphenyl esters
Glutaric acid; dimethyl, diphenyl esters
1,10-dodecanedioic acid; dimethyl, diphenyl esters
Sebacic acid; dimethyl, diphenyl esters
Diols (Z=—OH)
Hydroquinone
Chlorohydroquinone
Methylhydroquinone
Phenyl hydroquinone
4,4'-dihydroxy diphenyl
4,4'-dihydroxy benzophenone
4,4'-dihydroxy-3-methyl benzophenone
4,4'-dihydroxy-3,3'-dimethyl benzophenone
4,4'-dihydroxy-3,3',5,5'-tetramethyl benzophenone
1,4-bis(3,5-dimethyl-4-hydroxybenzoyl)benzene
1,3-bis(3,5-dimethyl-4-hydroxybenzoyl)benzene
1,4-butane diol
1,2-ethane diol
1,3-dihydroxy-2,2-dimethyl propane
1,4-bis(2,2-dimethyl-3-hydroxypropyl)benzene
Diols, including those listed above, may be utilized in the form of diesters

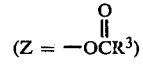

which are prepared from the diols by reactions with monocarboxylic acids.

Dicarbonates

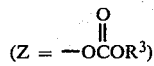
(Z = —OCOR³)

are normally prepared by reacting the corresponding diol with phosgene

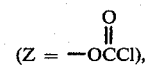
(Z = —OCCl), followed by a monoalcohol.

Diamines (Z=—NH₂)
1,4 diamino benzene
1,3-diamino benzene
bis(4-aminocyclohexyl)methane
hexamethylene diamine
ethylenediamine
1,4-bis(2,2-dimethyl-3-aminopropyl)benzene
1,4-xylylene diamine
1,3-xylylene diamine
Diisocyanates (Z=—NCO)
Toluene-2,4-diisocyanate
bis(4-phenylisocyanate)methane
Toluene-2,6-diisocyanate
Hexamethylenediisocyanate
1,4-phenyldiisocyanate
1,3-phenyldiisocyanate
1,4-xylylene diisocyanate
1,3-xylylene diisocyanate
Dihydrazides

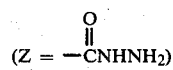
(Z = —CNHNH₂)

are normally prepared by reacting the corresponding dicarboxylic acid, or its ester or acyl chloride, with hydrazine.

Diamideoximes

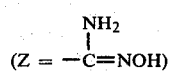
(Z = —C=NOH)

are normally prepared by reacting the corresponding dicarboxylic amide with hydroxylamine in quaternary salt form (usually hydrochloride or sulfate) in the presence of an inorganic base such as NaOH.

The 9,10-dihydro-9,10-ethanoanthraceno polymers and copolymers of this invention may be prepared by one or more of the following methods, all of which are described in the literature:

(i) Stirred Interfacial Polymerization (Morgan, P. W. "Condensation Polymers By Interfacial and Solution Methods", Interscience, 1965, pp. 65–114; Wittbecker, E. L. and Morgan, P. W., J. Polymer Sci., 40, 289 (1959);

(ii) Solution Polymerization (ibid, pp. 115–161; Kwolek, S. and Morgan, P. H., J. Polymer Sci., A2, 2695 (1964)); Frazer, A. H., "High Temperature Resistant Polymers", Interscience 1968, pp. 86–90; 176–182);

(iii) Melt Polymerization (Schaefgen, U.S. Pat. No. 4,075,262; Frazer, A. H., ibid, p. 106).

Polyesters are generally prepared by stirred interfacial polycondensation in which ethanoanthraceno diols, in aqueous alkaline medium, are reacted with dibasic acid chlorides in methylene chloride. Polyamides, polyurethanes and polycarbonates are generally prepared by solution polymerization in which the starting compounds are reacted in any appropriate organic solvent. For polyamides and polycarbonates, diacids are normally reacted in the form of acid chlorides. Polyureas may be prepared by either interfacial or solution polycondensation procedures. Polyesters may also be prepared by melt polymerization at elevated temperatures; normally the diols are melt-polymerized in the form of their diacylate esters, preferably the diacetates, with diacids of formula 4. Polyamides may also be prepared by melt polymerization in which ethanoanthraceno diamines are normally reacted with formula 4 diacids in the form of phenyl or methyl esters.

Polyhydrazides may be prepared by solution polycondensation, in a basic solvent such as N-methylpyrrolidone, of ethanoanthraceno dicarboxylic acids or their acyl chlorides with dihydrazides of formula 4 wherein Z is —CONHNH₂. Poly(1,2,4-oxadiazoles) are prepared by the thermal cyclodehydration of intermediate poly-O-acyl-amideoximes which, in turn, have been prepared by the solution condensation of diamideoximes of formula 4 with ethanoanthraceno dicarboxylic acids, or their esters of acyl chlorides, in suitable solvents such as N,N-dimethylacetamide or trifluoroacetic acid. Poly(1,3,4-oxadiazoles) are conveniently prepared by the thermal cyclodehydration of the corresponding polyhydrazide prepared as described above. The termal conversion is usually carried out at or near the glass transition temperature of the polyhydrazide in a nitrogen atmosphere or under vacuum.

Condensation polymers and copolymers of formula 1 are amorphous and tractable relative to the corresponding unbridged anthraceno polymers because of the presence of the ethano bridge between the 9- and 10-positions which acts to disrupt molecular order and crystallinity. Said polymers of formula 1, accordingly, are invariably lower melting and more soluble than the corresponding unbridged polymers and may readily be formed into shaped articles by conventional polymer processing practices as, for example, melt, dry or wet spinning, melt or solution casting, extrusion, molding and the like. Preferred forms of formula 1 polymers are fibers and films. The latter may be cast from the melt or from solution. Fibers may be spun from the melt, or from solution by either "dry" or "wet" methods; dry spinning is normally preferred.

In dry spinning, fine streams of polymer solution are passed into a heated tower against the flow of a current of gas which evaporates the solvent from the threadline and provides a filament bundle that is collected outside the chamber. The effluent gas stream is treated separately for the recovery of solvent.

In wet spinning, fine streams of polymer solution are passed into a liquid bath composed of a non-solvent for the polymer (or of a chemical precipitant where dissolution is effected by chemical means) that causes coagulation to filaments which are carried onwards for further treatment.

In melt spinning, the molten polymer is forced in filamentary form into a cool atmosphere or a liquid-quenching bath below the spinneret, where it solidifies and can be wound up. Melt spinning is applicable only to materials that are adequately stable at the high temperatures commonly imposed by their melting or softening points.

Choice of melt or solution processing is determined by the melting point of the ethanoanthraceno polymer with respect to the temperature at which said polymer is converted by olefin elimination into the corresponding anthraceno polymer. It is normally highly desirable and preferred to prepare shaped articles from formula 1 polymers prior to their conversion to anthraceno polymers because of the intractability of the latter. Olefin elimination from formula 1 polymers normally occurs at temperatures above about 290° C. Thus, if the polymer melts at a temperature much above about 300° to 325° C., it is normally preferable to process by a solution technique since such processing can occur at much lower temperatures, for example, below about 100° C. Melt processing techniques may be employed and indeed are preferred when the polymer melting point is below about 300° C.

Solvents for the ethanoanthraceno polymers of formula 1 include, but are not limited to, trifluoroacetic acid (TFA); N,N-dimethylacetamide (DMAC); dimethylformamide (DMF); hexamethylphosphoramide (HMPA); DMAC, DMF or HMPA containing 5 weight % lithium chloride; m-cresol; sulfuric acid; and mixtures of TFA with methylene chloride, trichloroethylene or tetrachloroethane; phenol with trichloroethylene or tetrachloroethane. The mixed solvents are preferably used in the ratio, by volume, of 40/60 to 60/40, most preferably 50:50.

Unbridged anthraceno polymers are in general insoluble in the above solvents, indeed in the great majority of solvents. Said polymers may be dissolved, with great difficulty, and with degradation, in hot, concentrated sulfuric acid. Moreover, said polymers have extremely high melting points, normally in excess of 400° C., which is an advantage in use but an extreme disadvantage in processing. Thus there is considerable incentive to avoid the direct processing, by either melt or solution methods, of anthraceno polymers. The present invention provides a practical means of providing such anthraceno polymers in the form of shaped articles ready for use, by preparing shaped articles from the tractable precursors, 9,10-dihydro-9,10-ethanoanthraceno polymers of formula 1, then converting the processed precursor polymers to anthraceno polymers by heating to a temperature sufficient to eliminate the ethano bridge, as described above.

The anthraceno polymers, in shaped form, prepared as just described, are useful materials because of their superior thermal stability, high stiffness modulus and high melting point.

It should be understood that the ethanoanthraceno polymers of formula 1, being more soluble, lower melting and more flexible than the corresponding anthraceno polymers, find utility as-is, i.e., without thermal conversion, in less demanding environments precisely because of their relatively facile fabricability.

In the following example of specific embodiments of this invention, parts and percentages are by weight unless otherwise specified and the following tests and designations were used.

Polymer melt temperature (PMT) is that temperature at which a fresh polymer sample leaves a wet molten trail when stroked with moderate pressure across a clean metal surface. A temperature-gradient bar covering the range of 50°–400° C. was used for this determination (Beaman and Cramer. J. Polymer Sci., XII, pg. 227).

Inherent viscosity is defined by the following equation:

$$\eta\ inh = \frac{\ln(\eta rel)}{C}$$

wherein ($\eta$rel) represents the relative viscosity and C represents a concentration of 0.5 gram of the polymer in 100 ml of solvent. The relative viscosity ($\eta$rel) is determined by dividing the flow time in a capillary viscometer of the dilute solution of the polymer by the flow time for the pure solvent. The dilute solutions used herein for determining ($\eta$rel) are of the concentration expressed by (C), above; flow times are determined at 30° C. unless otherwise indicated, the solvent is a 40/60 mixture of 1,1,2,2-tetrachloroethane (TCE) and phenol.

The standard fiber test designation T/E/Mi refers to tensile strength in grams per denier/elongation in percent/initial modulus of elasticity in tension in grams per denier. At least three breaks are averaged. Different values may be obtained from single filaments (filament properties) than from multi-filament strands (yarn properties) of the same sample. Except where otherwise specified, all properties given herein are yarn properties.

Orientation angle (OA) was determined by the method of Kwolek U.S. Pat. No. 3,671,542, Column 2, lines 8-41.

Optical anisotropy of polymer melts was measured by the thermo-optical test (TOT) method as described in Schaefgen U.S. Pat. No. 4,075,262.

Polymers of formula 1 other than those shown in the Examples are readily prepared by substituting known compounds of formulas 3 and 4 for those exemplified.

For example, substitution of diiosocyanates of formula 4 wherein Z is —NCO, for diacids (or their chlorides or esters) in Examples 1-4 results in polyurethanes of formula 1 wherein X is

Substitution of bis(chlorocarbonates) or bis(alkylcarbonates) of formula 4 wherein Z is

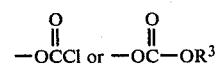

for diacids (or their chlorides or esters) in Examples 7-11 results in polyurethanes of formula 1 wherein X is

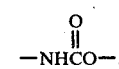

Substitution of bis(chlorocarbonates) or bis(alkylcarbonates) for diacids in Examples 1-4 results in polycarbonates of formula 1 wherein X is

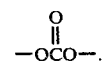

Substitution of diisocyanates for diacids in Examples 7-11 results in polyureas of formula 1 wherein X is

Substitution of ethylene diamine for ethylene glycol in Examples 5 and 6 results in polyamides of formula 1 wherein X is

Substitution of 1,4-dihydrazidobutane (5.22 g) for adipoyl chloride, and 2,6-dicarboxy-9,10-ethano-9,10-dihydroanthracene (8.82 g) for 2,6-diamino-9,10-ethano-9,10-dihydroanthracene in Example 7A results in a polyhydrazide of formula 1 wherein X is

Poly(1,3,4-oxadiazoles) of formula 1 where X is

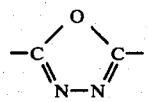

are prepared by thermal cyclodehydration of the corresponding polyhydrazide as described herein above.

Poly(1,2,4-oxadiazoles) of formula 1 wherein X is

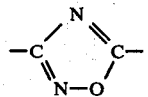

are prepared by thermal cyclodehydration of precursor poly-O-acyl amideoximes prepared by solution polycondensation of 2,6- and/or 2,7-dicarboxy-9,10-ethano-9,10-dihydroanthracenes, or their acyl chlorides, with diamideoximes of formula 4 wherein Z is

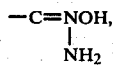

as described herein above.

EXAMPLE 1

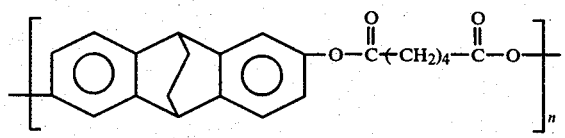

Polyester of
2,6-Dihydroxy-9,10-ethano-9,10-dihydroanthracene
and adipic Acid

1A By Interfacial Polymerization

To a Waring blender was charged 7.14 g (0.03 mole) of 2,6-dihydroxy-9,10-ethano-9,10-dihydroanthracene, 2.70 g sodium hydroxide, 2.30 g tetraethylammonium chloride, and 210 ml of oxygen-free water. The mixture was stirred until the solids were dissolved. As stirring was continued, a solution of 5.45 g (0.03 mole) of adipoyl chloride in 100 ml of methylene chloride was added. The mixture was stirred an additional 10 minutes, poured into 2 l. of boiling water, and the methylene chloride flashed off. The precipitate was washed with water until free of base (normally 3 times), and dried. The polyester product (8.8 g, 83.8% of theory) was white, softened at 167° C., had a PMT of 275° C., DTA and TGA melt points of 290° C., an inherent viscosity of 0.24, and was amorphous to X-ray diffraction. Fibers were spun manually at 185° C.

Found: C, 73.74; H, 5.77; O, 17.85: Calc: C, 76.28; H, 5.25; O, 18.47.

Ethylene was eliminated from the polymer on heating at about 280° to 300° C. The final anthraceno polyester was stable in air to 350°–400° C.

1B By Melt Polymerization

A glass tube was charged with 32.2 g (0.1 mole) of 2,6-diacetoxy-9,10-ethano-9,10-dihydroanthracene and 14.6 g (0.1 mole) of adipic acid. The tube was sealed and heated at 197° for 20 hrs. The contents of the tube were then heated in an atmosphere of nitrogen at 197° C. for a further 20 hrs, and finally at 197° C. under vacuum (0.05 mm) for 20 hrs. The polyester product had a PMT of 230° C. and an inherent viscosity of 0.72. Ethylene was eliminated on heating at about 285° C.

EXAMPLE 2

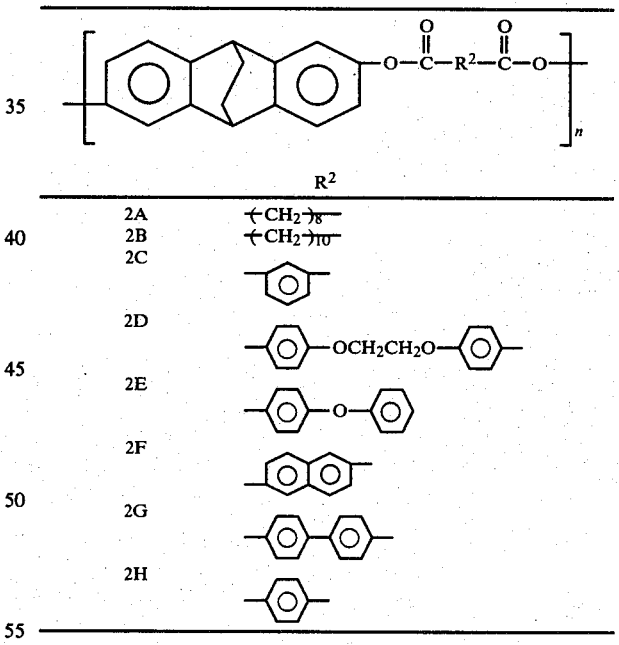

2(A–H)

Diacid chlorides (0.03 mole) of the formula ClO-C—R$^2$—COCl, in which R$^2$ is as given above, were substituted for adipoyl chloride in Example 1A. Acid chloride quantities, product yields and analyses are shown in Table 2-1, and polymeric product properties are summarized in Table 2-2. All polymers were amorphous by X-ray diffraction. Ethylene was eliminated from all polymer products at temperatures above about 250° C. The resultant anthracenic polyesters were stable in air to temperatures of about 350° to 400° C.

Polyester of 2,6-Dicarbomethoxy-9,10-propano-9,10-dihydroanthracene and Ethylene Glycol 1.69 g (0.005 mole) of 2,6-dicarbomethoxy-9,10-propano-9,10-dihydroanthracene, 0.31 g (0.005 mole) of ethylene glycol and 0.0015 g of tetraisopropyltitanate were heated together in nitrogen at 200° C. for 24 hrs, 270° C. for 6 hrs, then in vacuum (0.05 mm) at 200° C. for 18 hrs, 220° C. for 18 hrs. The polyester product had a PMT of 255° C. and an inherent viscosity of 1.05. Propylene evolved from the polymer at approximately the PMT.

EXAMPLE 7

[structural formula of polyamide with -NHC(O)-(CH$_2$)$_4$-C(O)NH- linkage]

Polyamide of 2,6-Diamino-9,10-ethano-9,10-dihydroanthracene and Adipic Acid

7A By Modified Solution Polymerization

A solution of 7.08 g (0.03 mole) of 2,6-diamino-9,10-ethano-9,10-dihydroanthracene in 104 ml of N-methylpyrrolidone was placed in an ice-cooled reaction flask equipped with stirrer, N$_2$ inlet and drying tube. To the solution was added, with stirring over a period of about 15 min., 5.49 g (0.03 mole) of adipoyl chloride. The mixture was stirred for about 16 hrs and the resultant polyamide was precipitated with water, collected, washed with water, and dried. Yield 10.1 g (96.7%). The polymer had an inherent viscosity of 0.53 and a softening point of 306° C.

7B By Melt Polymerization 2.36 g (0.01 mole) of 2,6-diamine-9,10-dihydro-9,10-ethanoanthracene and 2.98 g (0.01 mole) of diphenyl adipate were heated together in nitrogen for 18 hrs at 197° C., and 18 hrs at 220° C., then in vacuum (0.05 mm) for 1 hr at 220° C. The polyamide had an inherent viscosity of 0.92 and a PMT of 320° C. Ethylene was eliminated at about 310° C.

EXAMPLE 8

[structural formula of polyamide with -NHC(O)-R$^2$-C(O)NH- linkage]

| Example | —R$^2$— |
|---|---|
| 8A | -(CH$_2$)$_8$- |
| 8B | -(CH$_2$)$_{10}$- |
| 8C | -(phenyl)- |
| 8D | -(phenyl)- |
| 8E | -(phenyl)-OCH$_2$CH$_2$O-(phenyl)- |
| 8F | -(phenyl)-O-(phenyl)- |
| 8G | -(naphthyl)- |
| 8H | -(phenyl)-(phenyl)- |

8(A-H)

Diacid chlorides of the formula ClOC—R$^2$—COCl in which R$^2$ is as shown above were substituted for adipoyl chloride in the process of Example 7A. Reactant quantities, polyamide product yields and polymer properties are listed below. Ethylene was eliminated from each polyamide at temperatures above approximately 300° C.

| Example | Diamine (g) | Diamine (mol) | Acid Chloride (g) | Acid Chloride (mol) |
|---|---|---|---|---|
| 8A | 6.37 | 0.027 | 6.45 | 0.027 |
| 8B | 6.37 | 0.027 | 7.21 | 0.027 |
| 8C | 7.08 | 0.03 | 6.09 | 0.030 |
| 8D | 7.08 | 0.03 | 6.09 | 0.030 |
| 8E | 5.66 | 0.024 | 8.14 | 0.024 |
| 8F | 6.37 | 0.027 | 7.97 | 0.027 |
| 8G | 6.37 | 0.027 | 6.83 | 0.027 |
| 8H | 6.37 | 0.027 | 7.53 | 0.027 |

| Example | Polyamide Product (g) | Polyamide Product (Yield, %) | Softening Temp. (°C.) | Inherent Viscosity |
|---|---|---|---|---|
| 8A | 8.4 | 77.1 | 245 | 0.73 |
| 8B | 10.0 | 85.5 | 280 | 0.93 |
| 8C | 9.4 | 86.2 | >350 | 1.34 |
| 8D | 8.2 | 75.2 | >350 | 0.40 |
| 8E | 10.8 | 89.3 | >350 | 1.22 |
| 8F | 10.5 | 84.7 | >350 | 1.14 |
| 8G | 9.4 | 83.2 | >350 | 0.94 |
| 8H | 10.2 | 85.0 | >350 | 2.05 |

EXAMPLE 9

[structural formula of polyamide with -NHC(O)-R$^2$-C(O)-NH- linkage]

| | —R$^2$— |
|---|---|
| 9A | -(CH$_2$)$_4$- |
| 9B | -(CH$_2$)$_8$- |
| 9C | -(CH$_2$)$_{10}$- |

9A 2,7-Diamino-9,10-dihydro-9,10-ethanoanthracene (35.4 g, 0.15 mole) and diphenyl adipate (44.7 g, 0.15 mole) were heated together in nitrogen for 18 hrs at

TABLE 2-1

| Example | Acid Chloride wt(g) = 0.03 mole | Polymer Product wt(g) | Yield (%) |
|---|---|---|---|
| 2A | 7.17 | 11.4 | 93.4 |
| 2B | 8.01 | 11.4 | 87.7 |
| 2C | 6.09 | 10.0 | 90.1 |
| 2D | 10.17 | 13.3 | 87.5 |
| 2E | 8.85 | 12.2 | 87.8 |
| 2F | 7.59 | 10.5 | 83.3 |
| 2G | 8.37 | 12.4 | 92.5 |
| 2H | 6.09 | 10.8 | 97.3 |

| | Polymer Elemental Analysis | | | | | |
|---|---|---|---|---|---|---|
| | Found | | | Calcd. | | |
| Ex. | C | H | O | C | H | O |
| 2A | 75.68 | 7.10 | 15.91 | 77.58 | 6.52 | 15.90 |
| 2B | 76.12 | 7.21 | 14.92 | 78.10 | 6.52 | 14.86 |
| 2C | 76.37 | 4.44 | 17.62 | 78.67 | 3.86 | 17.47 |
| 2D | 74.15 | 4.93 | 19.60 | 76.48 | 4.48 | 19.10 |
| 2E | 77.45 | 4.55 | 17.13 | 78.59 | 3.96 | 17.45 |
| 2F | 78.64 | 4.78 | 15.73 | 80.75 | 3.88 | 15.37 |
| 2G | 80.20 | 4.71 | 14.40 | 81.43 | 4.11 | 14.46 |
| 2H | — | — | — | — | — | — |

TABLE 2-2

| Ex. | Softening Temp. (°C.) | Fiber Spin Temp. (°C.) | Melting Point (°C.) (PMT) | (DTA) | (TGA) | Inherent Viscosity |
|---|---|---|---|---|---|---|
| 2A | 150 | 194 | | 275 | 300 | 0.51 |
| 2B | 156 | 195 | 300 | 225 | 225 | 0.51 |
| 2C | 340 | — | | | | 0.72 |
| 2D | 252 | 282 | 285 | 300 | 295 | 0.53 |
| 2E | >385 | >350 | >380 | | | 0.55 |
| 2F | 285 | — | 295 | 300 | 290 | 0.54 |
| 2G | >380 | >350 | >380 | >350 | | 0.54 |
| 2H* | | | >400 | | | 3.41 |

*Thin films cast from solution, had an IR spectrum consistent with the bridged ethano structure.

A portion of the polyester prepared in Part H was dissolved (15% solids) in a 50/50 v/v mixture of trifluoroacetic acid and methylene chloride. Fibers were spun from the solution and tensile-tested (at room temperature) as-spun and after drawing at 255° C. Fibers were then heated at 255° C. for 24 hrs in nitrogen and under restraint to eliminate the ethano bridge and convert them to the corresponding anthraceno polyesters, then re-tested at room temperature. Results are given in Table 2-3:

TABLE 2-3
(Ex. 2H)

| | Ethanoanthraceno Polyester | | | |
|---|---|---|---|---|
| Fiber Sample | Tensile (g/d) | Elongation (%) | Mi (g/d) | Cryst. |
| As spun | 1.1 | 46 | 25 | A |
| 1.5x @ 255° C. | 2.3 | 16 | 40 | A |
| 1.6x @ 255° C. | 2.1 | 23 | 35 | A |
| 1.7x @ 255° C. | 2.5 | 12 | 44 | A |

| | Anthraceno Polyester | | | | |
|---|---|---|---|---|---|
| Fiber Sample | Tensile (g/d) | Elongation (%) | Mi (g/d) | OA | Cryst. |
| As spun | 3.0 | 10 | 53 | 45 | L |
| 1.5x @ 255° C. | 5.8 | 3 | 222 | 23 | M |
| 1.6x @ 255° C. | 4.9 | 4 | 123 | 30 | M |
| 1.7x @ 255° C. | 6.2 | 3 | 245 | 21 | M |

Key
A = Amorphous
L = Low Crystallinity
M = Medium Crystallinity

EXAMPLE 3

3A Copolyester of 2,6-Dihydroxy-9,10-ethano-9,10-dihydroanthracene, 1,2-Bis(4,4'-carboxyphenoxy)-ethane and Adipic Acid A glass tube was charged with 3.22 g (0.001 mole) of 2,6-diacetoxy-9,10-ethano-9,10-dihydroanthracene, 1.51 g (0.005 mole) of 1,2-bis(4,4'-carboxyphenoxy)ethane and 0.73 g (0.005 mole) of adipic acid. The sealed tube was heated at 197° C. for 20 hrs. The contents were then heated in nitrogen for 20 hrs at 197° C. and finally at 260° C. for 4 hrs in nitrogen. The copolyester product had a PMT of >400° C., and an inherent viscosity of 0.53. Ethylene was eliminated at 295° C. (DTA).

3B Copolyester of 2,6-Dihydroxy-9,10-ethano-9,10-dihydroanthracene, 1,2-Bis(4,4'-carboxyphenoxy)ethane and Sebacic Acid In the procedure of Part A, sebacic acid (1.01 g, 0.005 mole) was substituted for adipic acid. The copolyester product had a PMT of 260° C. and an inherent viscosity of 0.52. Ethylene was eliminated at about 295° C.

EXAMPLE 4

Copolyester of 2,6-Dihydroxy-9,10-ethano-9,10-dihydroanthracene, Terephthalic Acid and Adipic Acid In the procedure of Example 3A, terephthalic acid (0.415 g, 0.0025 mole) was substituted for 1,2-bis(4,4'-carboxyphenoxy)ethane, and 1.095 g (0.0075 mole) of adipic acid was used. The copolyester product had a PMT of 250° C. and an inherent viscosity of 0.53. Ethylene was eliminated at about 295° C.

EXAMPLE 5

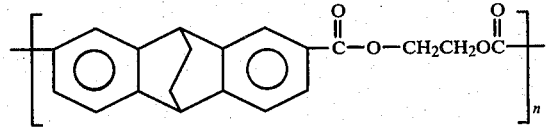

Polyester of 2,7-Dicarbomethoxy-9,10-ethano-9,10-dihydroanthracene and Ethylene Glycol 19.32 g (0.06 mole) of 2,7-dicarbomethoxy-9,10-ethano-9,10-dihydroanthracene, 3.72 g (0.06 mole) of ethylene glycol, and 0.012 g of tetraisopropyl titanate were heated in nitrogen for 24 hours at 200° C. and 6 hrs at 220° C., then in vacuum (0.05 mm) for 18 hrs at 200° C. and 18 hrs at 220° C. The resultant polyester had a PMT of 290° C. and an inherent viscosity of 1.00. Fibers could be spun manually from this polymer; ethylene was evolved during spinning.

EXAMPLE 6

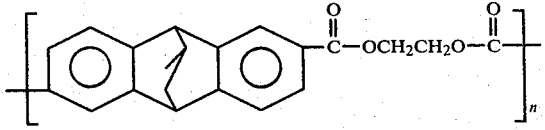

197° C. and 18 hrs at 220° C., then under vacuum (0.05 mm) for 8 hrs at 220° C. The resultant polyamide (50 g) had an inherent viscosity of 1.02 and a PMT of 320° C. Fibers were dry spun mechanically from a solution of 45 g of the polyamide in 255 ml of trifluoroacetic/-methylene chloride (1:1 v/v), and tensile-tested at room temperature as-spun and after drawing at 225°–230° C. Fibers were then heated at 255° C. for 24 hrs in nitrogen and under restraint to eliminate the ethano bridge, then re-tested at room temperature or 150° C. Results are given in Table 9-1.

TABLE 9-1

(Ex. 9A)

| Fiber Sample | Ethanoanthraceno Polyamide | | | |
|---|---|---|---|---|
| | Tensile (g/d) | Elong. (%) | Mi (g/d) | Crysty. |
| As spun | 1.1 | 45 | 18 | A |
| 1.5x @ 225° C. | 1.5 | 23 | 18 | A |
| 1.7x @ 225° C. | 1.5 | 23 | 18 | A |
| 1.8x @ 230° C. | 2.1 | 15 | 23 | A |

| Fiber Sample | Anthraceno Polyamide | | | | |
|---|---|---|---|---|---|
| Tested at Rm. Temp. | Tensile (g/d) | Elong. (%) | Mi (g/d) | OA | Crysty. |
| As spun | 3.0 | 7 | 50 | 45 | L |
| 1.5x @ 225° C. Rm. | 4.2 | 7 | 85 | 23 | M |
| 1.7x @ 225° C. | 4.5 | 7 | 90 | 25 | M |
| 1.8x @ 230° C. | 5.3 | 8 | 98 | 21 | M |
| Tested at 150° C. | | | | | |
| 1.8x @ 230° C. | 2.9 | 10 | 55 | | |

Key
A = Amorphous
L = Low crystallinity
M = Medium crystallinity

9B

Substitution of diphenyl sebacate (3.54 g, 0.01 mole) for diphenyl adipate in Part A, together with 2,7-diamino-9,10-dihydro-9,10-ethanoanthracene (2.36 g, 0.01 mole), yielded a polyamide of inherent viscosity of 0.95 and PMT of 315° C. Ethylene was eliminated at 308° C.

9C

Substitution of diphenyl dodecanedioate (3.82 g, 0.01 mole) in Part B yielded a polyamide of inherent viscosity 0.90 and PMT of 285° C. Ethylene was eliminated at 300° C.

EXAMPLE 10

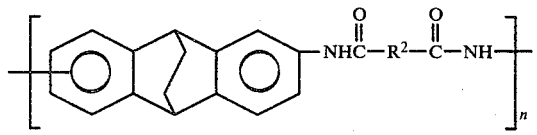

Copolyamides of 2,6- and
2,7-Diamino-9,10-dihydro-9,10-ethanoanthracene

| | —R²— |
|---|---|
| 10A | ⁻(CH₂)₄⁻ |
| 10B | ⁻(CH₂)₈⁻ |
| 10C | ⁻(CH₂)₁₀⁻ |

10A 2,6-diamino- (1.18 g, 0.005 mole) and 2,7-diamino-9,10-dihydro-9,10-ethanoanthracene (1.19 g, 0.005 mole) were melt-polymerized with diphenyl adipate (2.98 g, 0.01 mole) under the conditions of Example 7B. The resultant copolyamide had an inherent biscosity of 0.95 and a PMT of 315° C. Ethylene was eliminated at 308° C.

10B

Substitution of diphenyl sebacate (3.54 g, 0.01 mole) for adipate in Part A yielded a copolyamide of inherent viscosity 0.98 and a PMT of 280° C. Ethylene was eliminated at 305° C.

10C

Substitution of diphenyl dodecanedioate (3.82 g, 0.01 mole) for diphenyl adipate in Part A yielded a copolyamide of inherent viscosity 0.98 and PMT of 250° C. Ethylene was eliminated at 305° C.

EXAMPLE 11

Copolyamides of 2,6- and
2,7-Diamino-9,10-dihydro-9,10-ethanoanthracene and
Mixed Dibasic Acids

11A 2,6-Diamino- (11.80 g, 0.05 mole) and 2,7-diamino-9,10-dihydro-9,10-ethanoanthracene (11.80 g, 0.05 mole) were melt-polymerized with diphenyladipate (14.90 g, 0.05 mole) and diphenylsebacate (17.70 g, 0.05 mole) under the conditions of Example 9A. The resultant copolyamide had an inherent viscosity of 1.03 and a PMT of 280° C. Ethylene was eliminated at 305° C.

11B

Substitution of diphenyl dodecanedioate (19.10 g, 0.05 mole) for diphenyl sebacate in Part A yielded a copolyamide of inherent viscosity 1.05 and a PMT of 280° C. Ethylene was eliminated at 305° C.

11C

Substitution of diphenyl sebacate (17.70 g, 0.05 mole) for diphenyl adipate in Part B yielded a copolyamide of inherent viscosity 1.04 and a PMT of 280° C. Ethylene was eliminated at 305° C.

We claim:
1. A process comprising forming a shaped article of a polymer containing repeating units of the structure

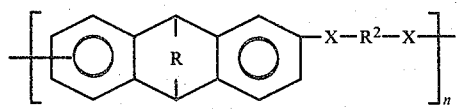

wherein —R— is —CR'CHR'— and —R' is —H or CH₃; and —R²— is, independently, an alkylene group containing 2 to 14 carbon atoms, an arylene group containing 6 to 14 carbon atoms, an alkyl-substituted or chloro-substituted arylene group containing 6 to 14 carbon atoms, a cycloalkylene group containing 4 to 14 carbon atoms, or

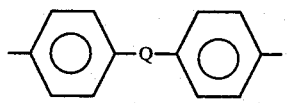

where —Q— is —OCH$_2$CH$_2$O—, $-\overset{\overset{O}{\|}}{C}-$, $\text{+CH}_2\text{+}_m$ where m is 1 to 10, $-\underset{\underset{CH_3}{|}}{\overset{\overset{CH_3}{|}}{C}}-$, $\text{+CF}_2\text{+}_o$ where o is 1 to 8, $-\underset{\underset{CF_3}{|}}{\overset{\overset{CF_3}{|}}{C}}-$, —NR$^3$— where R$^3$ is an alkyl group containing 1 to 6 carbon atoms or an aryl group containing 6 to 12 carbon atoms,

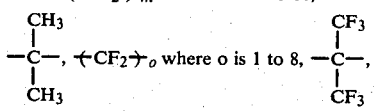

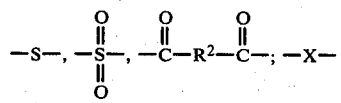

and n is at least 10; heating the shaped article above about 250° C. to convert the polymer to a polymer having repeating units of the structure

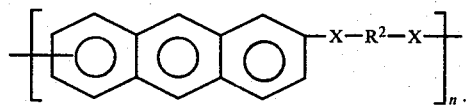

2. The process of claim 1 wherein —X— is

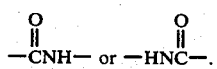

3. The process of claim 2 wherein —R$^2$— is alkylene.
4. The process of claim 2 wherein —R$^2$— is arylene.
5. The process of claim 2 wherein —R$^2$— is

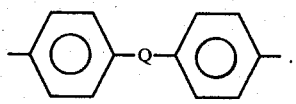

6. The process of claim 5 wherein —R$^2$— is —OCH$_2$CH$_2$O— or —CH$_2$—$_m$.

7. The process of claim 2 wherein —R$^2$— is a mixture of arylene and alkylene.

8. The process of claim 7 wherein —R$^2$— is a mixture of any one or more of

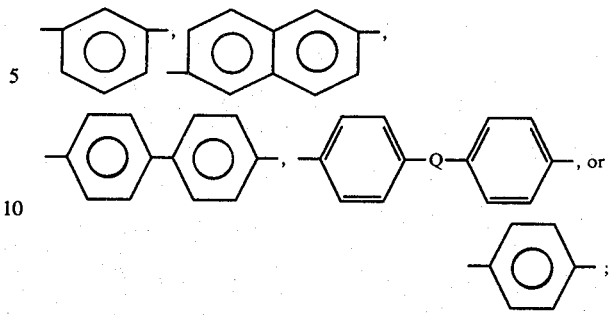

and alkylene.

9. The process of claim 1 wherein R is —CH$_2$CH$_2$— or

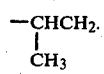

10. A polymer, in the form of a shaped article, consisting essentially of repeating units of the structure

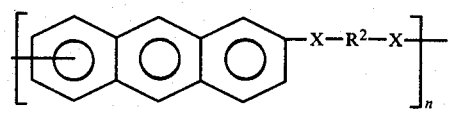

wherein —R$^2$— is an alkylene group containing 2 to 14 carbon atoms, an arylene group containing 6 to 14 carbon atoms, an alkyl-substituted or chloro-substituted arylene group containing 6 to 14 carbon atoms, a cycloalkylene group containing 4 to 14 carbon atoms, or

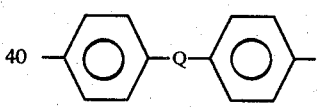

where —Q—is —O—, —OCH$_2$CH$_2$O—, $-\overset{\overset{O}{\|}}{C}-$, $\text{+CH}_2\text{+}_m$ where m is 1 to 10, $-\underset{\underset{CH_3}{|}}{\overset{\overset{CH_3}{|}}{C}}-$, $\text{+CF}_2\text{+}_o$ where o is 1 to 8, $-\underset{\underset{CF_3}{|}}{\overset{\overset{CF_3}{|}}{C}}-$, —NR$^3$—where R$^3$ is an alkyl group containing 1 to 6 carbon atoms or an aryl group containing 6 to 12 carbon atoms, —S—, $-\overset{\overset{O}{\|}}{\underset{\underset{O}{\|}}{S}}-$ or $-\overset{\overset{O}{\|}}{C}-R^2-\overset{\overset{O}{\|}}{C}-$; —X— is $-O\overset{\overset{O}{\|}}{C}-$, $-\overset{\overset{O}{\|}}{C}O-$, $-\overset{\overset{O}{\|}}{C}NH-$, or $-NH\overset{\overset{O}{\|}}{C}-$; and n is at least 10.

* * * * *

UNITED STATES PATENT AND TRADEMARK OFFICE
CERTIFICATE OF CORRECTION

PATENT NO. : 4,281,106
DATED : July 28, 1981
INVENTOR(S) : Burton C. Anderson and August H. Frazer It is certified that error appears in the above—identified patent and that said Letters Patent is hereby corrected as shown below:

Column 17, line 26, "1.5x @ 225°C. Rm." should read -- 1.5x @ 225°C. --.

Column 18, line 62, "-CR'CHR'-" should read -- -CR'$_2$CHR'- --.

Column 19, line 55, "-CH$_2$-$_m$" should read -- $(CH_2)_m$ --.

Signed and Sealed this

Fifteenth Day of December 1981

[SEAL]

Attest:

GERALD J. MOSSINGHOFF

Attesting Officer     Commissioner of Patents and Trademarks